United States Patent
Ligi, Jr. et al.

(10) Patent No.: US 10,215,214 B2
(45) Date of Patent: Feb. 26, 2019

(54) MULTI-ENGAGEMENT PUSH CLIP ASSEMBLY

(71) Applicant: FORD GLOBAL TECHNOLOGIES, LLC, Dearborn, MI (US)

(72) Inventors: Anthony Ligi, Jr., Chelsea, MI (US); Kenneth S. Laird, Canton, MI (US); Katherine Ann Buck, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 15/332,098

(22) Filed: Oct. 24, 2016

(65) Prior Publication Data
US 2018/0112699 A1    Apr. 26, 2018

(51) Int. Cl.
F16B 19/00    (2006.01)
F16B 21/08    (2006.01)

(52) U.S. Cl.
CPC ............ F16B 21/086 (2013.01); F16B 19/00 (2013.01)

(58) Field of Classification Search
CPC ........ F16B 19/00; F16B 21/08; F16B 21/084; F16B 21/086; B60R 13/02; B60R 13/0206
USPC .......................................... 411/508–509, 510
See application file for complete search history.

(56) References Cited

U.S. PATENT DOCUMENTS

| | | | |
|---|---|---|---|
| 4,395,174 A * | 7/1983 | Freeman | F16B 15/06 411/387.1 |
| 4,396,329 A * | 8/1983 | Wollar | F16B 21/084 24/614 |
| 5,039,267 A * | 8/1991 | Wollar | F16B 21/08 411/508 |
| 5,150,865 A | 9/1992 | Miller | |
| 5,387,065 A * | 2/1995 | Sullivan | F16B 19/1081 411/45 |
| 5,829,937 A * | 11/1998 | Morello | B60R 13/0206 411/510 |
| 6,074,150 A * | 6/2000 | Shinozaki | B60R 13/0206 24/297 |
| 6,276,644 B1 | 8/2001 | Jennings et al. | |
| 6,345,946 B1 * | 2/2002 | Mainini | F16B 5/065 411/339 |
| 6,405,413 B2 * | 6/2002 | Ichimaru | F16B 2/20 24/297 |
| 6,665,914 B2 * | 12/2003 | Ogawa | F16B 5/06 24/289 |
| 7,300,089 B2 * | 11/2007 | Kuroda | B60R 13/0206 24/297 |
| 7,862,272 B2 * | 1/2011 | Nakajima | F16B 21/084 411/41 |
| 8,029,222 B2 | 10/2011 | Nitsche | |

(Continued)

FOREIGN PATENT DOCUMENTS

DE    19615019 A1    10/1997

OTHER PUBLICATIONS

English Machine Translation of DE19615019A1.

*Primary Examiner* — Roberta S Delisle
(74) *Attorney, Agent, or Firm* — Vichit Chea; King & Schickli, PLLC (57) ABSTRACT

A push clip assembly includes a clip tower and a retention clip carried on the clip tower. The retention clip includes a first set of retaining ribs projecting in a first direction and a second set of retaining ribs projecting in a second direction.

14 Claims, 7 Drawing Sheets

(56) References Cited

U.S. PATENT DOCUMENTS 8,221,042 B2     7/2012   Vitali
9,771,964 B2 *   9/2017   Leveen .................. F16B 12/10

* cited by examiner

MULTI-ENGAGEMENT PUSH CLIP ASSEMBLY

TECHNICAL FIELD

This document relates generally to the fastener field and, more particularly, to a push clip assembly incorporating a clip tower and a retention clip including first and second sets of retaining ribs.

BACKGROUND

Figure 1:
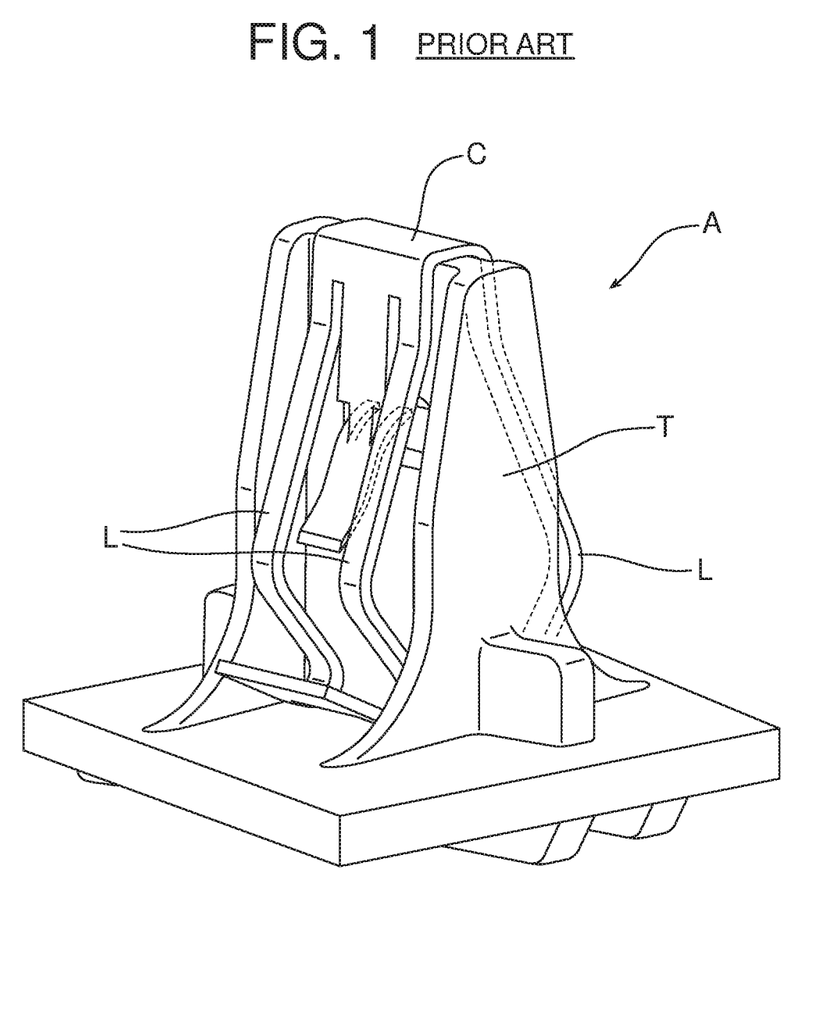
FIG. 1 is a perspective view of a prior art push clip assembly incorporating a plastic clip tower holding a metal retention clip.

Push clip assemblies to secure plastic trim components to underlying support components of a motor vehicle are well known in the art. FIG. 1 illustrates such a prior art push clip assembly A. That push clip assembly A incorporates a resilient metal clip C held on a molded plastic clip tower T. The opposed legs L of the clip C spring outward to provide an interference connection between the two work pieces that are being connected together.

While such a push clip assembly A provides relatively high clamp load for a secure connection, a metal clip of this nature cannot be manufactured with multiple retaining ribs capable of accommodating a reasonably wide range of manufacturing tolerances.

In contrast, plastic clips known as "Christmas tree" fasteners F (see FIG 1a) include multiple retaining ribs R. However, such fasteners F either require a doghouse molded into the panel to retain the mushroom-shaped head H of the fastener or they must pass through a hole to sandwich a part between the mushroom-shaped head H and the retaining ribs R. Unfortunately, for many applications, tooling freedom does not allow the necessary clearance for a doghouse and as a result only a conventional clip tower can be packaged.

Figure 1A:
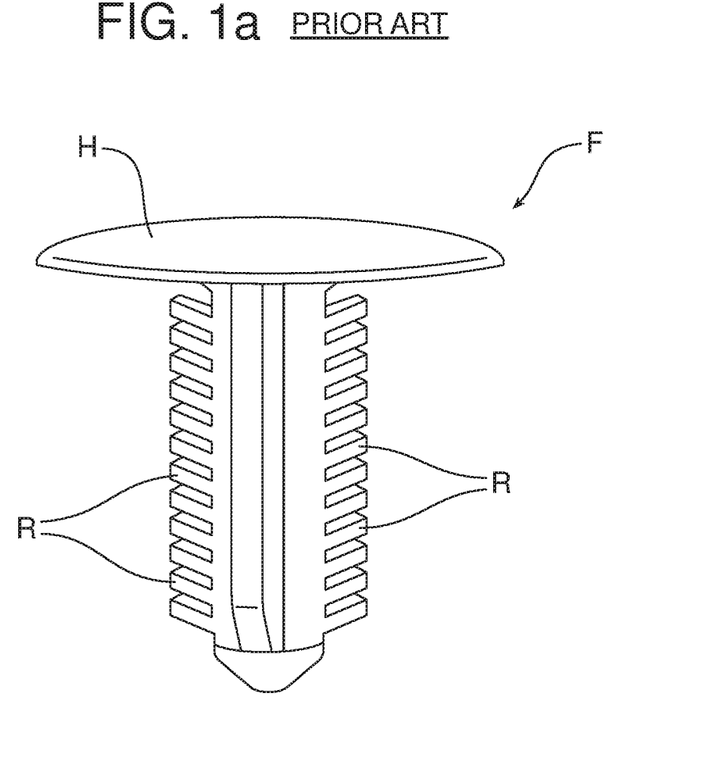
FIG. 1a is an elevational view of a prior art Christmas tree fastener.

This document relates to a new and improved push clip assembly which is effectively a hybrid of the prior art push clip assembly A shown in FIG. 1 and the Christmas tree fastener F shown in FIG. 1a. Advantageously, the new and improved push clip assembly includes multiple sets of retaining ribs to accommodate variation in retention surface angle and part tolerances, provides a clamp load similar to a metal clip, and eliminates the need for a doghouse thereby easing packaging requirements and increasing designer freedom while employing a relatively simple construction that is inexpensive to produce.

SUMMARY

In accordance with the purposes and benefits described herein, a new and improved push clip assembly is provided. That push clip assembly comprises a clip tower and a retention clip carried on the clip tower. The retention clip includes a first set of retaining ribs projecting in a first direction and a second set of retaining ribs projecting in a second direction. The first direction may be opposed to the second direction.

More specifically, the retention clip may include a first leg and a second leg. The first leg may include a first proximal end and a first distal end while the second leg may include a second proximal end and a second distal end. The first proximal end may be connected to the second proximal end.

The first distal end may include a first resilient flange while the second distal end may include a second resilient flange. A first set of retaining ribs may be carried on a first outboard face of the first leg while a second set of retaining ribs may be carried on a second outboard face of the second leg.

Further, a receiver may be defined between the first inboard face of the first leg and the second inboard face of the second leg. In addition, a first fastening tab may be provided on the first inboard face of the first leg. Similarly, a second fastening tab may be provided on the second inboard face of the second leg.

In one or more of the many possible embodiments of the push clip assembly, the first resilient flange may be angled toward the first set of retaining ribs and the first set of retaining ribs may be angled toward the first resilient flange. Similarly, the second resilient flange may be angled toward the second set of retaining ribs while the second set of retaining ribs may be angled toward the second resilient flange.

The clip tower of the push clip assembly may include a wall, a first end flange and a second end flange. A first channel may be provided between the first end flange and the second end flange along a first face of the wall. A second channel may be provided between the first end flange and the second end flange along a second face of the wall. When the retention clip is properly seated on the clip tower, the wall of the clip tower is received in the receiver of the retention clip. A window may be provided in the wall. Further, the first fastening tab and the second fastening tab may be engaged in that window.

In accordance with an additional aspect, a retention clip is provided. That retention clip comprises a first leg having a first proximal end and a first distal end, a second leg having a second proximal end and a second distal end, a first set of retaining ribs, a second set of retaining ribs and a receiver defined between a first inboard face of the first leg and a second inboard face of the second leg. The first proximal end of the first leg is connected to the second proximal end of the second leg. The first set of retaining ribs project from a first outboard face of the first leg. The second set of retaining ribs project from a second outboard face of the second leg.

The first distal end may include a first resilient flange while the second distal end may include a second resilient flange. The first resilient flange may be angled toward the first set of retaining ribs and the first set of retaining ribs may be angled toward the first resilient flange. The second resilient flange may be angled toward the second set of retaining ribs and the second set of retaining ribs may be angled toward the second resilient flange. In addition, the retention clip may include a first fastening tab on the first inboard face and a second fastening tab on the second inboard face.

Further, the retention clip may be made from a resilient plastic or composite material by molding or other appropriate methods.

In the following description, there are shown and described several preferred embodiments of the push clip assembly and the retention clip. As it should be realized, the push clip assembly and the retention clip are capable of other, different embodiments and their several details are capable of modification in various, obvious aspects all without departing from the push clip assembly and retention clip as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the push clip assembly and the retention clip and together with the description serve to explain certain principles thereof.

Reference will now be made in detail to the present preferred embodiments of the push clip assembly and the retention clip, examples of which are illustrated in the accompanying drawing figures.

DETAILED DESCRIPTION

Figure 2A:
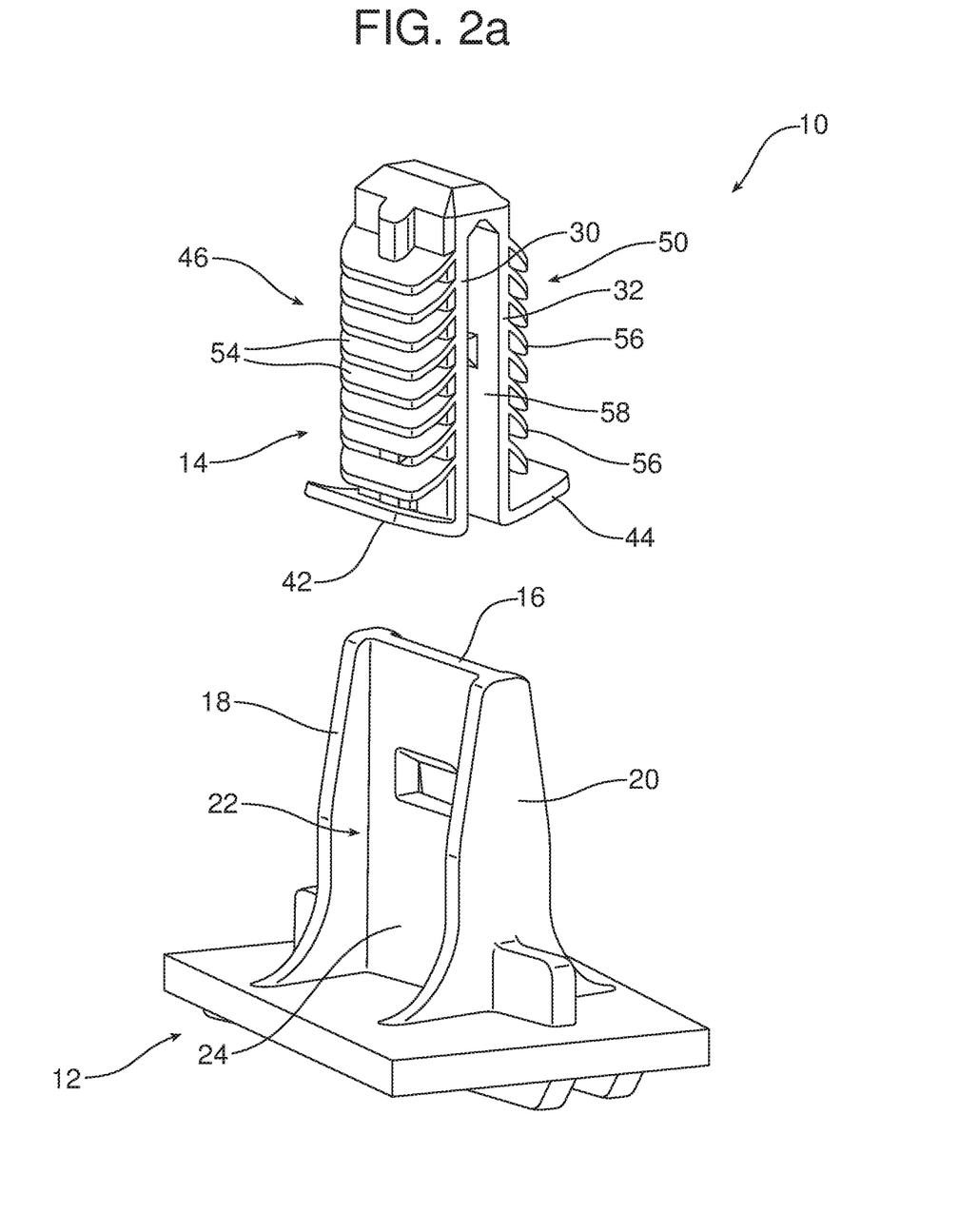
FIGS. 2a and 2b are perspective illustrations of the new and improved push clip assembly incorporating a clip tower and a retention clip with first and second sets of retaining ribs.
Figure 2B:
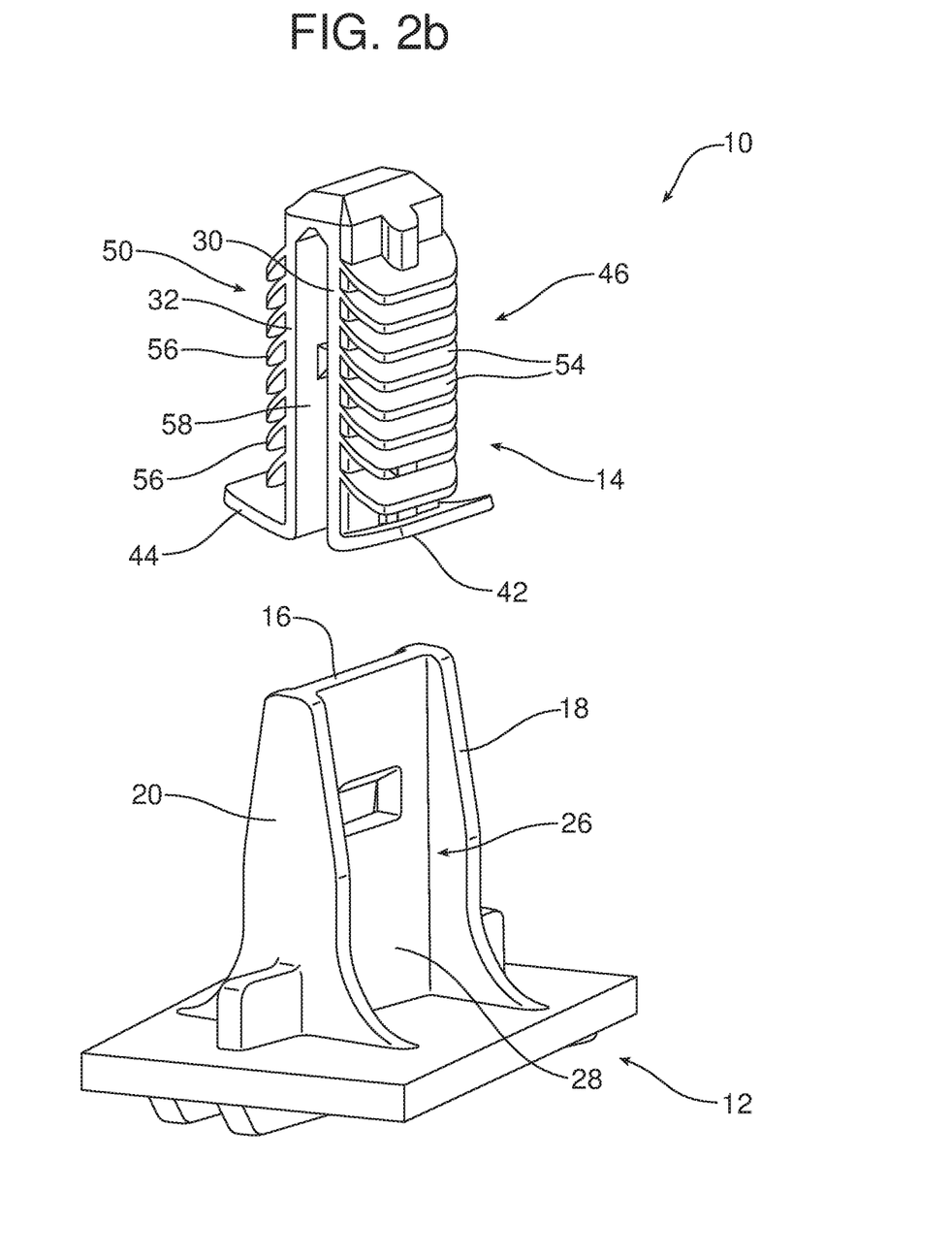

Reference is now made to FIGS. 2a and 2b illustrating the new and improved push clip assembly 10 including a clip tower 12 and a retention clip 14 carried on the clip tower.

As illustrated, the clip tower 12 includes a wall 16 extending between a first end flange 18 and a second end flange 20. A first channel 22 is provided between the first end flange 18 and the second end flange 20 along a first face 24 of the wall 16. Similarly, a second channel 26 is provided between the first end flange 18 and the second end flange 20 along a second face 28 of the wall 16. The clip tower 12 may be molded from a plastic or composite material and may be made as an integral part of a work piece or panel on the B side of the work piece or panel. See FIGS. 4 and 5.

Figure 3:
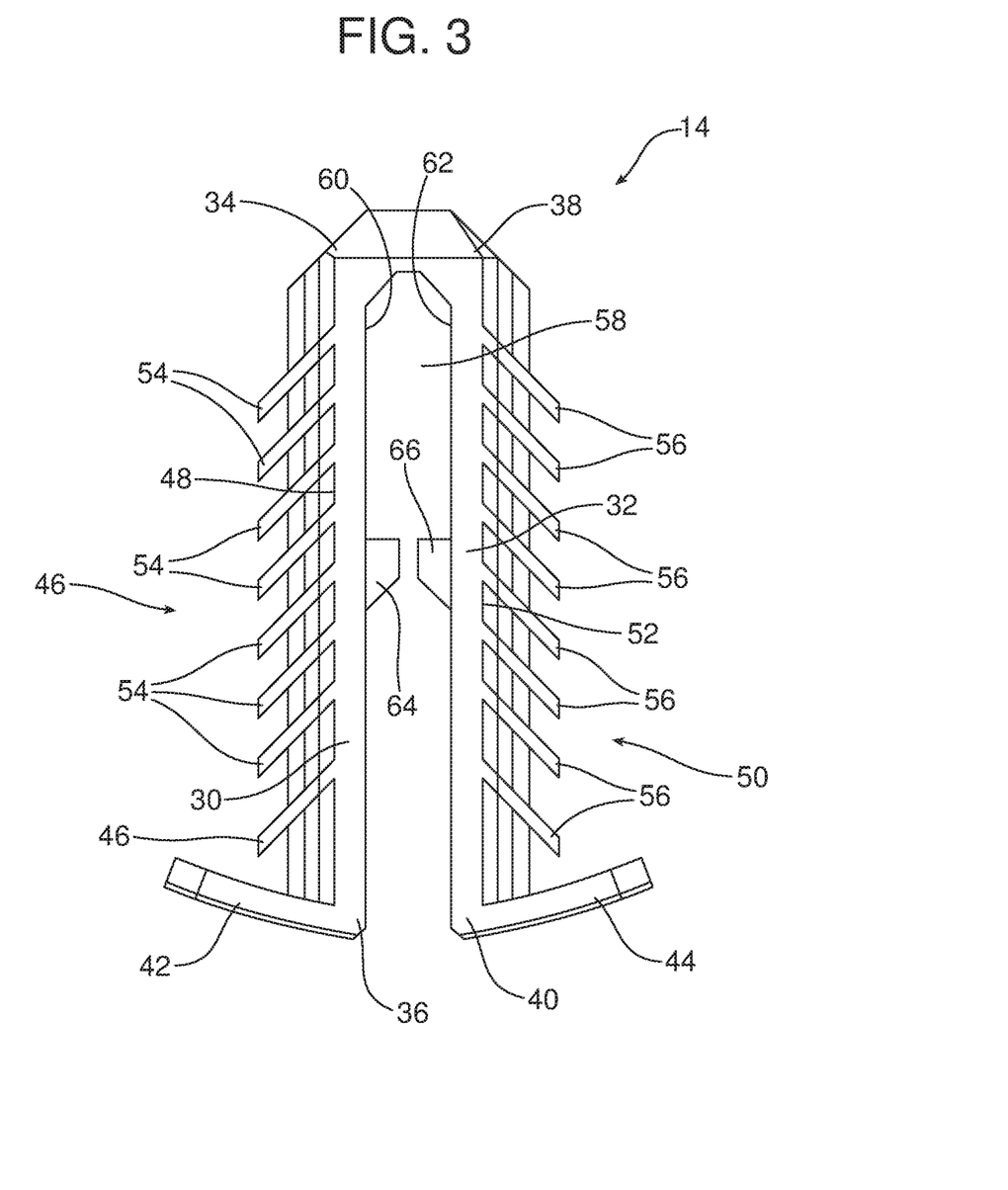
FIG. 3 is a detailed side elevational view of the retention clip.

Reference is now made to FIGS. 2a, 2b and 3 illustrating the retention clip 14 which may, for example, be molded from a resilient plastic or composite material.

The retention clip 14 includes a first leg 30 and a second leg 32. The first leg 30 includes a first proximal end 34 and a first distal end 36. The second leg 32 includes a second proximal end 38 and a second distal end 40. As shown, the first proximal end 34 of the first leg 30 is connected to the second proximal end 38 of the second leg 32.

The first distal end 36 includes a first resilient flange 42 while the second distal end 40 includes a second resilient flange 44. A first set of retaining ribs 46 are carried on a first outboard face 48 of the first leg and a second set of retaining ribs 50 are carried on a second outboard face 52 of the second leg 32. In the illustrated embodiment, the first set of retaining ribs 46 includes eight individual ribs 54 and the second set of retaining ribs 50 includes eight individual ribs 56. In the illustrated embodiment all of the ribs 54 are identical in size and shape. Similarly, all of the individual ribs 56 are identical in size and shape. Further, the individual ribs 54 are opposed to the individual ribs 56. It should be appreciated that the illustrated embodiment is merely exemplary and that the push clip assembly 10 may include ribs 54, 56 of differing sizes, differing shapes, different spacing and even unopposed ribs depending on the needs for any particular application.

A receiver 58 is defined between the first inboard face 60 of the first leg 30 and the second inboard face 62 of the second leg 32. In addition, a first fastening tab 64 is provided on the first inboard face 60 of the first leg 30. A second fastening tab 66 is provided on the second inboard face 62 of the second leg 32.

As further illustrated in FIGS. 2a, 2b and 3, the first resilient flange 42 is angled toward the ribs 54 of the first set of retaining ribs 46 and the first set of retaining ribs is angled toward the first resilient flange. Similarly, the second resilient flange 44 is angled toward the ribs 56 of the second set of resilient ribs 50 and the second set of retaining ribs is angled toward the second resilient flange.

Figure 4:
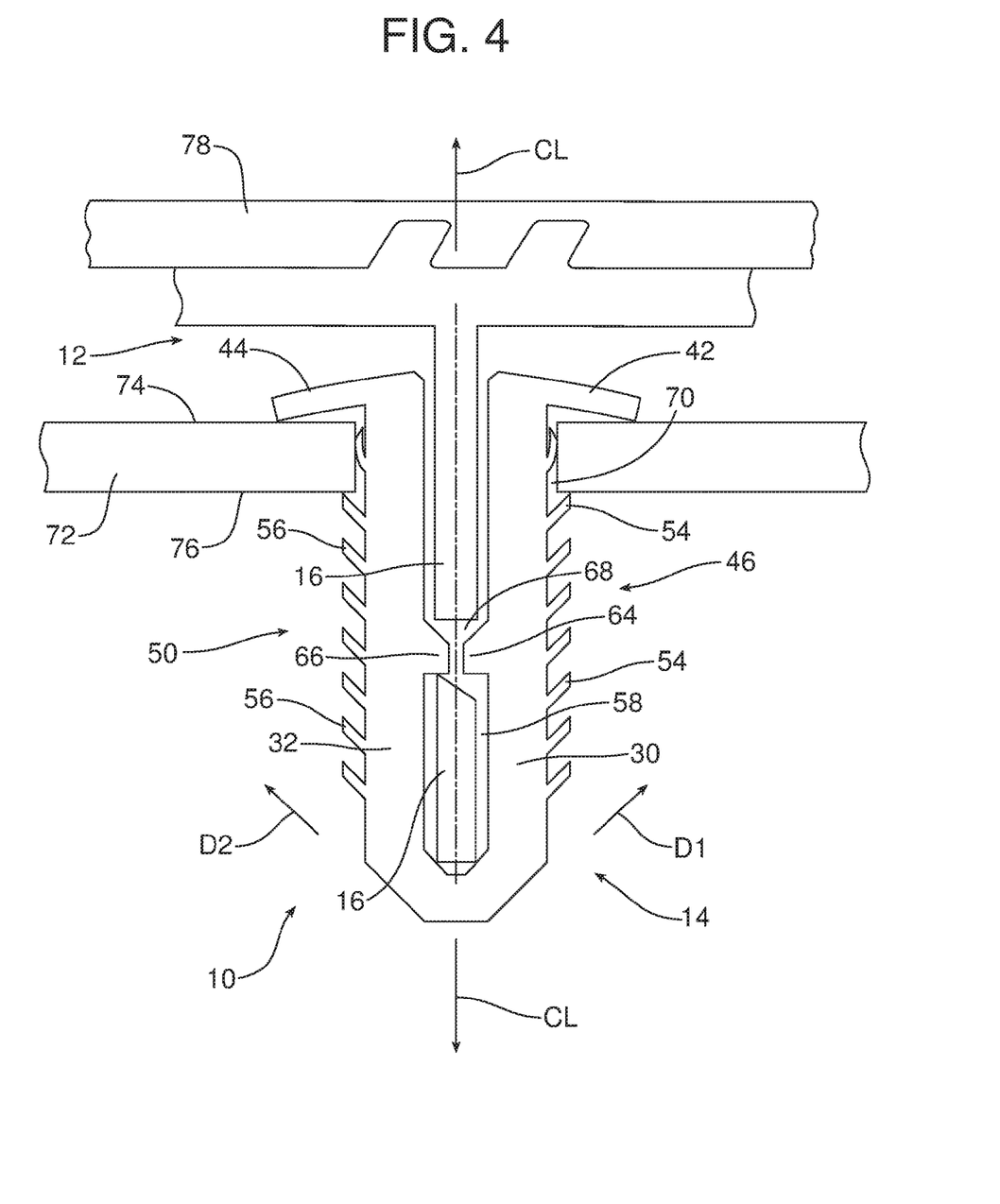
FIG. 4 is a schematic illustration showing the fully assembled push clip assembly engaging a work piece extending perpendicular to the center line of that push clip assembly.
Figure 5:
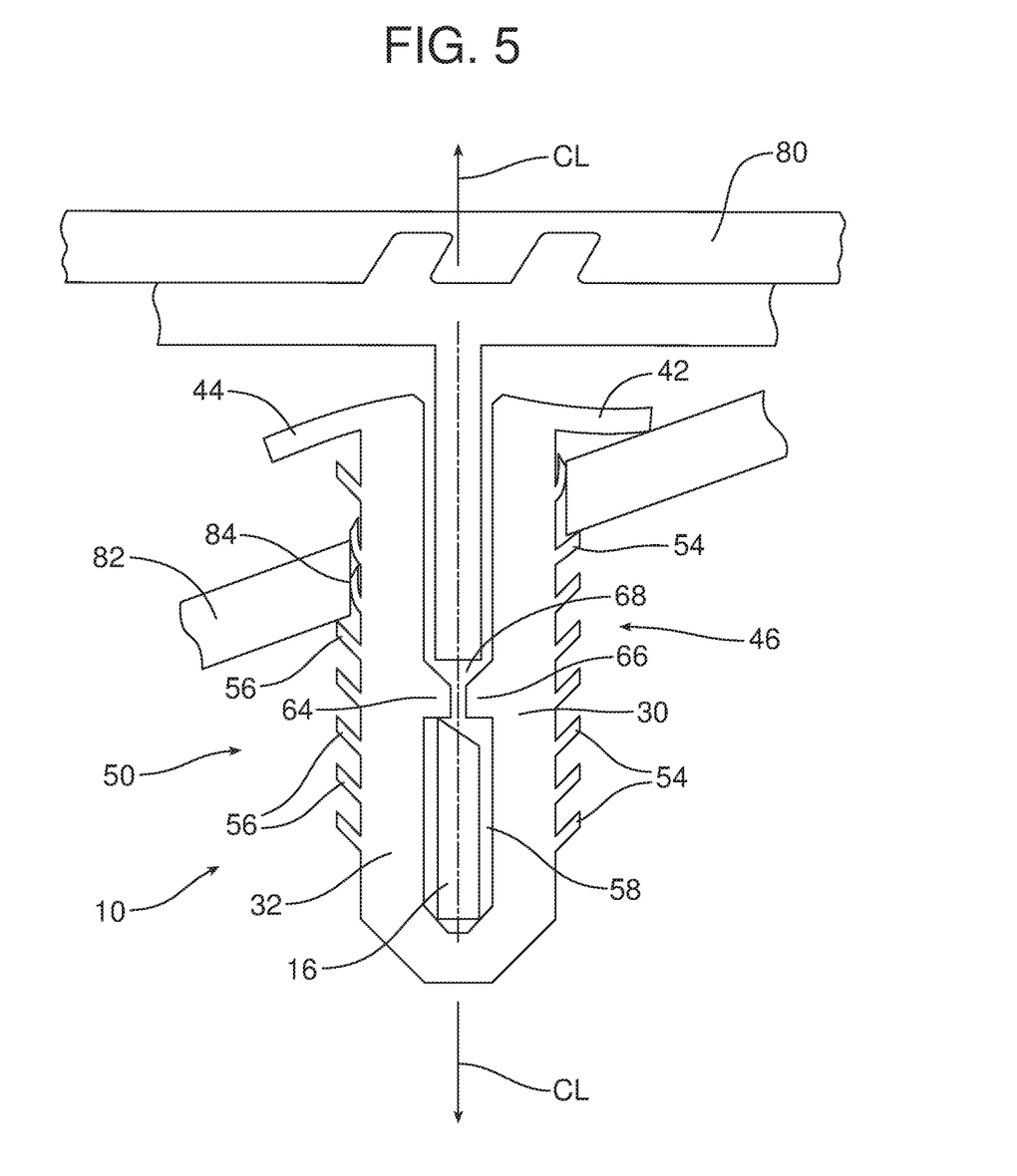
FIG. 5 is a view similar to FIG. 4 but illustrating how the push clip assembly may also be used to retain a work piece wherein the retention surface angle is not perpendicular to the center line of the clip tower due to manufacturing tolerances or package design requirements.

As illustrated in FIGS. 4 and 5 when the push clip assembly 10 is properly assembled, the retention clip 14 is fully seated on the clip tower 12 with the wall 16 received in the receiver 58. The first fastening tab 64 and the second fastening tab 66 are also engaged in the window 68 provided in the wall 16. As illustrated, the first set of retaining ribs 46 project in a first direction D1 while the second set of retaining ribs 50 project in a second direction D2.

FIG. 4 illustrates how the retention clip 14 of the push clip assembly 10 engages an aperture 70 in a work piece 72. More specifically, the retention clip 14 is pushed into the aperture 70 until the face 74 of the work piece 72 engages with the first resilient flange 42 and second resilient flange 44 and one rib 54 of the first set of retaining ribs 46 and one rib 56 of the second set of retaining ribs 50 engages the opposite face 76 of the work piece. As should be appreciated, the ribs 54, 56 in engagement with the face 76 ensure retention of the retention clip 14 in the aperture 70. The resilient flanges 42, 44 engaging the face 74 initially allow over engagement for a tight fit and then provide the necessary loading to resist rattling between the work piece 72 and the work piece 78. Here it should be noted that the first set of retaining ribs 46 and second set of retaining ribs 50 provide for multi-tiered engagement unavailable with a push clip assembly of prior art design as illustrated in FIG. 1. As a consequence, the push clip assembly 10 provides a number of benefits and advantages. One such advantage is illustrated in FIG. 5.

FIG. 5 illustrates how the first and second sets of retaining ribs 46, 50 allow the push clip assembly 10 to be utilized to secure the work piece 80 to the work piece 82 even when the work piece 82 and the aperture 84 in the work place 82 are angled (not perpendicular as in FIG. 4) to the center line CL of the push clip assembly 10. Proper retention is not possible in this situation with the opposed legs of the resilient metal clip C of the prior art push clip assembly A illustrated in FIG. 1. Of course, the multiple tiers of engagement provided by the sets of retaining ribs 46, 50 also allow for part retention in response to trim piece loading such as may occur, for example, when an airbag is deployed. More specifically, the trim piece may slip past one or two retaining ribs 54, 56 but other retaining ribs 54, 56 of the sets of retaining ribs 46, 50 remain to retain the trim piece in place. In contrast, the prior art push clip assembly A only provides an interference connection at a single point and offers no multi-tiered engagement feature or function.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A push clip assembly, comprising:
a clip tower including a window; and
a retention clip carried on said clip tower, said retention clip including (a) a first set of retaining ribs projecting in a first direction and a second set of retaining ribs projecting in a second direction (b) a first fastening tab and a second fastening tab engaged in said window and (c) a first leg and a second leg wherein said first set of retaining ribs are carried on a first outboard face of said first leg and said second set of retaining ribs are carried on a second outboard face of said second leg.

2. The push clip assembly of claim 1, wherein said first direction is opposed to said second direction.

3. The push clip assembly of claim 2, wherein said retention clip includes a first leg and a second leg.

4. The push clip assembly of claim 3, wherein said first leg includes a first proximal end and a first distal end and said second leg includes a second proximal end and a second distal end wherein said first proximal end is connected to said second proximal end.

5. The push clip assembly of claim 4, wherein said first distal end includes a first resilient flange and said second distal end includes a second resilient flange.

6. The push clip assembly of claim 5, wherein a receiver is defined between a first inboard face of said first leg and a second inboard face of said second leg.

7. The push clip assembly of claim 6, wherein said first fastening tab is on said first inboard face of said first leg.

8. The push clip assembly of claim 7, wherein said second fastening tab is on said second inboard face of said second leg.

9. The push clip assembly of claim 8, wherein said first resilient flange is angled toward said first set of retaining ribs and said first set of retaining ribs is angled toward said first resilient flange.

10. The push clip assembly of claim 9, wherein said second resilient flange is angled toward said second set of retaining ribs and said second set of retaining ribs is angled toward said second resilient flange.

11. The push clip assembly of claim 10, wherein said clip tower includes a wall, a first end flange and a second end flange.

12. The push clip assembly of claim 11, further including a first channel between said first end flange and said second end flange along a first face of said wall and a second channel between said first end flange and said second end flange along a second face of said wall.

13. The push clip assembly of claim 12, wherein said wall is received in said receiver.

14. The push clip assembly of claim 13, wherein said window is in said wall.

* * * * *